Dec. 29, 1931.  V. J. BURNELLI  1,838,297
HYDROAIRPLANE
Filed July 27, 1929    2 Sheets-Sheet 1
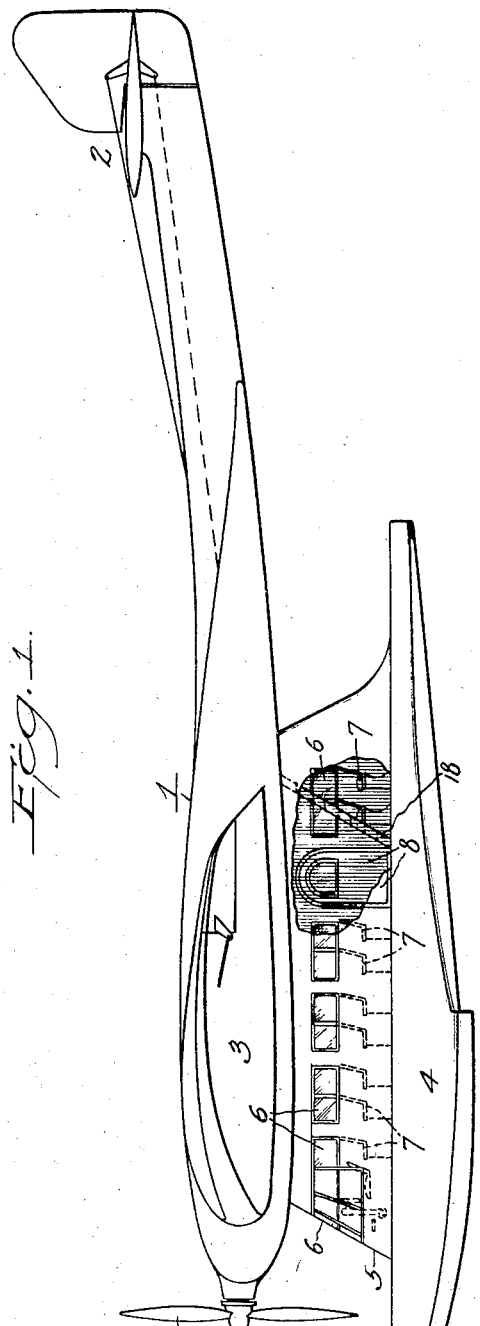
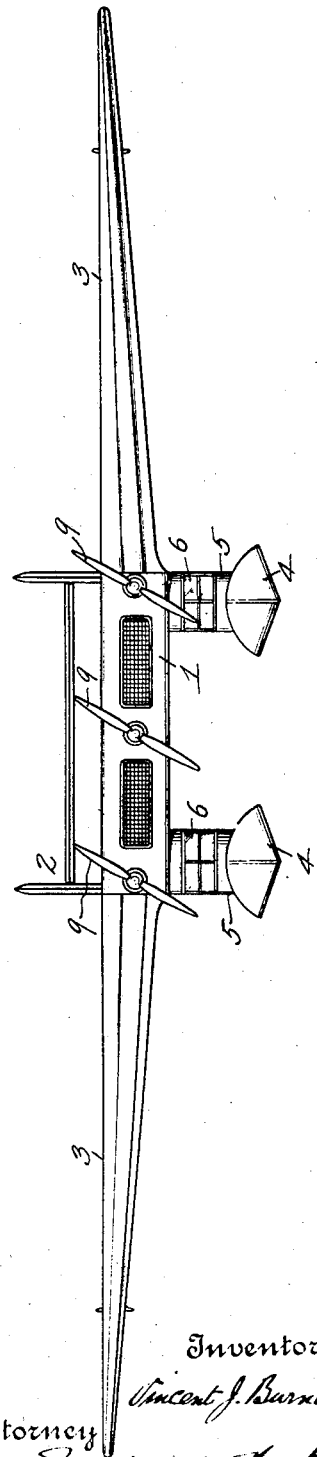
Inventor
Vincent J. Burnelli
By his Attorney
Frederick P. Baker

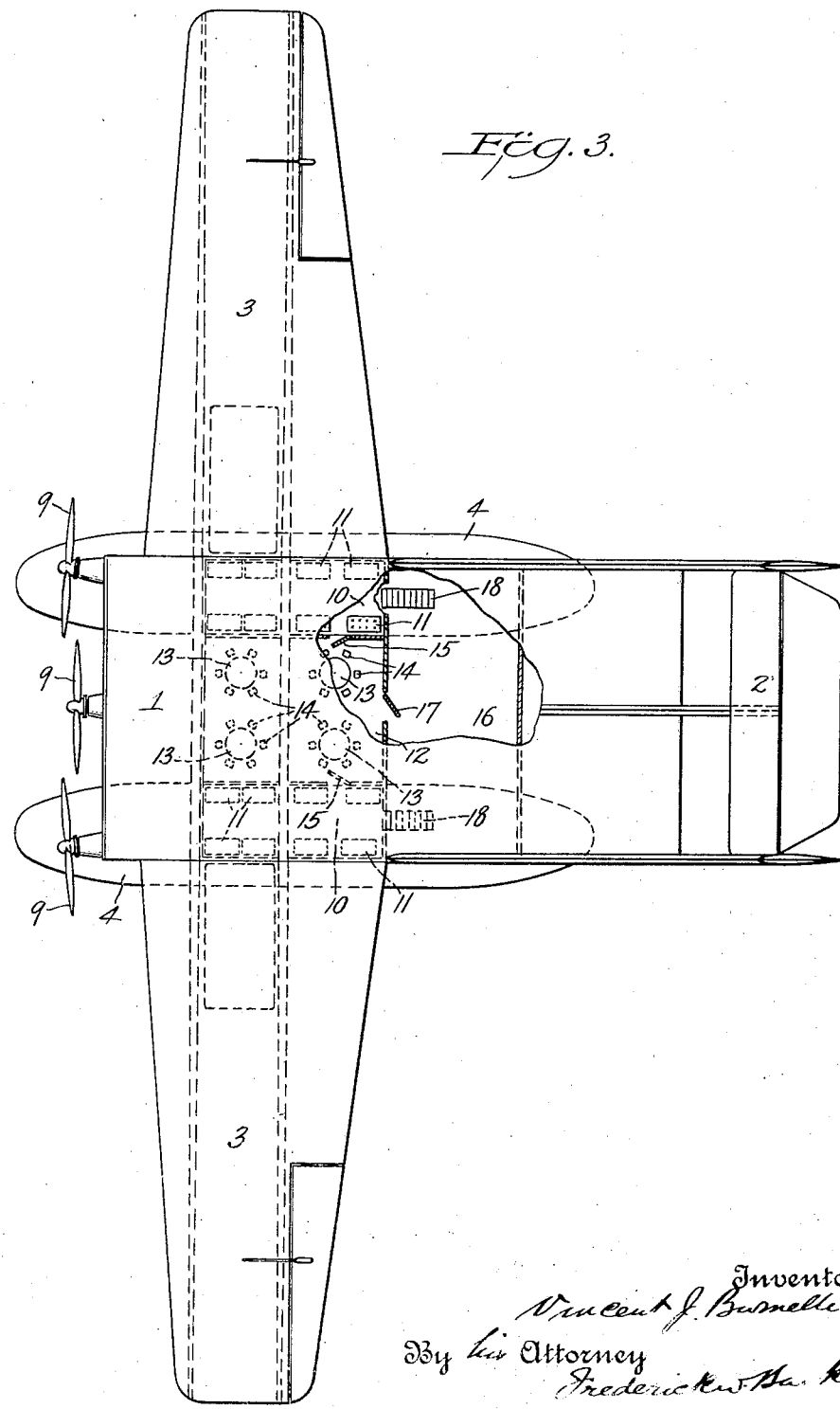

Patented Dec. 29, 1931

1,838,297

UNITED STATES PATENT OFFICE

VINCENT J. BURNELLI, OF NEW YORK, N. Y., ASSIGNOR TO THE UPPERCU-BURNELLI CORPORATION, A CORPORATION OF DELAWARE

HYDROAIRPLANE

Application filed July 27, 1929. Serial No. 381,434.

This invention relates to seaplanes of large passenger carrying capacity and my improvements in particular are directed to means whereby passenger accommodation, with unobstructed outlooks, is provided in cabin structures formed intermediate the fuselage and pontoons, the walls of said cabins having stream lined contour.

Also in my improved seaplane I employ monoplane supporting means of the Burnelli type, wherein the fuselage is of airfoil contour throughout and the main supporting airfoils are outspanned from said airfoil fuselage in merged relation therewith; the combination of said airfoil fuselage, the pontoons and the intermediate cabins permitting the interior of the airfoil fuselage to provide passenger sleeping accommodation, a dining room and a baggage compartment; while the cabins intermediate the pontoons and said airfoil-fuselage are available for use by the passengers in the day time, there being within said cabins means of intercommunication with the airfoil fuselage interior.

Other features and advantages of my invention will hereinafter appear.

In the drawings:

Figure 1 is a side elevation of a seaplane embodying my improvements, a portion thereof being broken away to show a cabin interior.

Figure 2 is a front elevation thereof, and Figure 3 is a top plan view, partly broken away to expose a portion of the airfoil fuselage interior.

In said drawings let 1 indicate an airfoil fuselage having the tail group 2, 3, 3 the main supporting airfoils autospanned from the airfoil fuselage and merged therewith, 4, 4 the pontoons which are located beneath the airfoil fuselage, and 5, 5 streamlined, hollow structures that connect the pontoons with the airfoil fuselage.

The hollow, streamlined structures 5, 5 take the place of the usual struts for connecting pontoons to an aircraft, and they have been devised by me as cabins for use with large, passenger carrying seaplanes for the purpose of enabling the passengers, seated therein, to have an unobstructed range of vision therefrom, windows 6 being provided in the walls of said structures, and seats, such for example as indicated at 7, also being provided.

Each cabin 5 may have a front seat for a pilot, and, preferably toward its rear portion, is provided with a door 8.

The airfoil fuselage herein illustrated is of unusually great width and is capable, within its leading edge portion, of containing three separate motors abreast, whose propellers are indicated at 9.

This great width of the airfoil fuselage enables the pontoons 4, 4 to be positioned directly beneath said airfoil fuselage, notwithstanding said pontoons have such spaced relation as is necessary to support the seaplane on water. Necessarily the cabin structures 5, 5, which connect the pontoons to the airfoil fuselage are attached to the under surface of the latter respectively near the opposite sides thereof, where the union of these elements can be most sturdily effective.

Further it will be appreciated that the channel formed between the structures 5, 5, beneath the airfoil fuselage, laterally confines the pressure of air that thereby is more effectively applied to the airfoil fuselage in this region. Since observation means for the passengers are unavailable from the airfoil fuselage interior, said interior may be employed for sleeping purposes, dining, etc. To this end the fuselage interior is shown as provided with the dormitories 10, 10 at its sides, with berths 11, and a central dining room 12, having tables 13 and chairs 14. Doors 15 lead from the dormitories to the dining room. A baggage compartment 16 which may have toilet conveniences is shown at the rear, with a doorway 17 leading into the dining room. Stairs 18 are shown as leading from each of the cabins 5 to the compartment 16 of the airfoil fuselage, thereby establishing means of intercommunication so that passengers may pass to and from the cabins 5 and the airfoil fuselage interior.

Variations within the spirit and scope of my invention are equally comprehended by the foregoing disclosure.

I claim:

1. The combination in a seaplane having a wide airfoil fuselage, of a pair of spaced pontoons, disposed beneath said airfoil fuselage, and stream-lined cabin structures which respectively connect said pontoons to said airfoil fuselage.

2. The combination in a seaplane having a wide airfoil fuselage, with passenger accommodation, of a pair of space pontoons disposed beneath said airfoil fuselage, and stream-lined cabin structures, having passenger accommodation, which respectively connect said pontoons to said airfoil fuselage, and means of communication between each of said cabin structures and said airfoil fuselage.

Executed this 24th day of July, 1929.

VINCENT J. BURNELLI.